3,245,944
COMPOSITIONS COMPRISING POLYAMIDES OR POLYESTERS AND SECONDARY AND/OR TERTIARY POLYHALOALCOHOLS
William J. Middleton, Wilmington, Del., assignor to E. I. du Pont de Nemours and Company, Wilmington, Del., a corporation of Delaware
No Drawing. Filed Aug. 21, 1961, Ser. No. 132,576
16 Claims. (Cl. 260—33.4)

This invention relates to, and has as its principal object provision of, novel polymer compositions comprising, as the essential ingredients, synthetic polyamides or polyesters in intimate admixture with certain polyhalogenated alcohols.

In many applications of high molecular weight polymers, such as film casting, coating, molding, use as adhesives, etc., solubility in organic solvents is a desirable property. Solubility at low or moderate temperatures, e.g., room temperature, is especially desirable in order to avoid or minimize the degradation of the polymer which often takes place when solution must be effected at high temperature to achieve a practically useful concentration of the polymer in the solvent. In addition to fluid solutions, solid or semisolid compositions wherein the polymer is homogeneously mixed with relatively small amounts of solvent serving as plasticizer or physical modifier have great utility in polymer technology, and these also require good solubility in the solvent at ordinary temperature.

Many high molecular weight linear polymers containing amide or ester linkages suffer from the disadvantages of poor solubility in organic solvents, and thus are not as broadly useful as they would otherwise be. This is particularly the case with the condensation-type amido polymers, i.e., the polyamides generically known as nylons, polyimides and polycarbamides (polyureas), and the condensation-type polyesters, including the polycarbonates and polycarbamates (polyurethanes) and especially those polyesters derived from aromatic dicarboxylic acids and glycols, such as polyethylene terephthalate. Very few good solvents are available for these amido or ester polymers. Solvents that are effective at ordinary or moderate temperature are still rarer, and, in fact, unknown in most cases.

It has now been found in accordance with this invention that high molecular weight, synthetic, linear condensation polymers are readily soluble in hydroxyl-containing organic solvents characterized by a hydrogen-bonding power of a magnitude corresponding to a shift of the infrared absorption band of the hydroxyl group of at least 0.34, and particularly in the polyhalogenated alcohols of the class defined below. The resulting new products are homogeneous compositions comprising as their essential ingredients a normally solid, synthetic, essentially linear polymer of molecular weight at least 3000, in which polymer at least two-thirds of the repeating units contain, as an integral member of the linear polymeric chain, an amido, i.e., carbonylamino group, or an ester, i.e., carbonyloxy group; and a polyhaloalcohol in which all halogen atoms are of atomic number 9–17, i.e., are fluorine or chlorine, said polyhaloalcohol having the general formula (I)

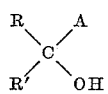

where R and R' taken singly are monovalent perhaloalkyl or ω-hydroperhaloalkyl radicals, and taken together can form a divalent perhaloalkylene radical, and A is hydrogen, hydroxy, halogen, cyano, alkoxy, hydrocarbon, halohydrocarbon, hydroxyhydrocarbon or halohydroxyhydrocarbon.

It will be seen from Formula I that the polymer solvents suitable for use in the compositions of this invention are secondary and tertiary polyhaloalcohols having a specific structure. Among such alcohols are included the gem-diols or 1-1-diols, i.e., the polyhaloketone hydrates (A=OH in Formula I), and the polyhaloketone hemiketals (A=alkoxy in Formula I).

The polyhaloalcohols may also be represented by the alternative formula (II)

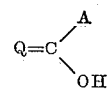

wherein A is defined as above and Q is selected from the group consisting of one divalent perhaloalkylene radical and two monovalent radicals chosen from the group consisting of perhaloalkyl and ω-hydroperhaloalkyl.

From the standpoint of effectiveness as solvents and accessibility, the preferred polyhaloalcohols are those in which the R and R' groups in Formula I, when taken singly, are fluoroperhalomethyl radicals or perfluoralkyl, ω-hydroperfluoroalkyl or ω-chloroperfluoroalkyl radicals of 2 to 12 carbon atoms; and, when taken together, are a divalent perhalotrimethylene radical wherein from 0 to 2 halogen atoms are chlorine, all others being fluorine. The group designated by A, when it is alkoxy, preferably contains from 1 to 6 carbon atoms; and, when it is a hydrocarbon group, which can be aliphatic, alicyclic or aromatic, saturated or unsaturated, or such a hydrocarbon group bearing halogen or hydroxy substituents (which may both be present at the same time), group A preferably contains from 1 to 10 carbon atoms.

While any polyhaloalcohol as defined above is operable for the purposes of this invention, a preferred class of these materials is that in which the group A in Formula I is hydrogen or hydroxyl and R and R', which may be alike or different, are fluoroperhalomethyl or perfluoroalkyl, ω-hydroperfluoroalkyl or ω-chloroperfluoroalkyl radicals of 2 to 12 carbon atoms. The most useful polyhaloalcohols, because of their excellent solvent power, are those in which the group A is hydrogen or hydroxyl and R and R' are fluoroperhalomethyl radicals, i.e., trifluoromethyl, chlorodifluoromethyl or dichlorofluoromethyl.

Many of the above-defined secondary or tertiary polyhaloalcohols can be prepared by methods described in the literature or by extensions of these published methods. Others are obtainable by methods described in copending patent applications. These include:

(1) The hydrates of the polyfluoroperhalo- and ω-hydropolyfluoroperhaloketones, i.e., the compounds of formula I where A is hydroxyl and R and R' each contain at least two fluorine atoms, and the corresponding tertiary alcohols, i.e., the compounds of Formula I where R, R' and A are polyfluoroperhaloalkyl radicals. These compounds can be prepared by the process described in U.S. Patent 2,980,738. They can also be prepared, as described in U.S. Patent 3,091,643, by the reaction, in a molar ratio of at least 2:1, of an ester of a polyfluoroperhalo- or ω-hydropolyfluoroperhaloalkanecarboxylic acid with an alkali metal alkoxide at temperatures below about 100° C., followed by acidification. This reaction gives the ketones and/or their hydrates, i.e., the gem-diols. The tertiary alcohols are prepared from the ketones by further reaction with the alkali metal alkoxide in the same molar ratio and same temperature range, followed by acidification.

(2) The hydrates and hemiketals of polyfluoroperhalocyclobutanones, i.e., the products of Formula I where R and R' together are a divalent perhaloalkylene radical of 3 carbon atoms, and A is hydroxy or alkoxy. These compounds can be prepared by the method described in U.S. Patents 3,039,995 and 3,129,248. This method comprises the hydrolysis by concentrated sulfuric acid of the 1,3,3,4,4 - pentafluoro - 2,2 - dihalo - 1 - hydrocarbyloxycyclobutanes, i.e., the ethers of the formula

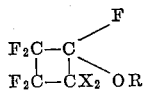

where X is fluorine or chlorine and R is a hydrocarbon radical, which are themselves prepared by cycloaddition at 125–250° C. of the requisite difluoroperhaloolefin $F_2C=CX_2$ and a perfluorovinyl hydrocarbyl ether $$F_2C=CFOR$$

The hydrolysis step yields the polyfluoro-perhalocyclobutanones and/or their hydrates. The free ketones form hydrates or hemiketals rapidly and spontaneously by reaction with water or alcohols.

(3) The perhaloalkyl- or ω-hydroperhaloalkyl-α-haloalcohols, i.e., the compounds of Formula I where A is halogen (fluorine or chlorine). These compounds can be prepared, as described in U.S. Patent 3,030,409, by reaction of anhydrous hydrogen fluoride or hydrogen chloride at temperatures below about 60° C. with the requisite perhaloketone or ω-hydroperhaloketone.

(4) The 1-aryl-, 1-hydroxyaryl- and 1-haloarylperhalocyclobutanols, i.e., the compounds of Formula I where R and R' together are a divalent perhaloalkylene radical of 3 carbon atoms, and A is aryl, hydroxyaryl or haloaryl. These compounds can be prepared by the process described in U.S. Patent 3,148,220. In this process, a 3,3,4,4 - tetrafluoro - 2,2 - dihalocyclobutanone is reacted with an aromatic hydrocarbon in the presence of conventional Friedel-Crafts catalysts, or with a hydroxy- or halo-substituted aromatic hydrocarbon, in which case no catalyst is necessary. With the more reactive systems, the reaction is spontaneous and exothermic. In other cases, a reaction temperature in the range of 75–200° C. is suitable.

(5) The bis-perhaloalkyl (or ω-hydroperhaloalkyl) aryl-, hydroxyaryl- or haloaryl carbinols, i.e., the compounds of Formula I where R and R' are perhaloalkyl or ω-hydroperhaloalkyl radicals and A is aryl, hydroxyaryl or haloaryl. These compounds can be prepared by the methods described in application S.N. 107,296, filed on May 3, 1961, by D.C. England. In these methods, the appropriate di(polyhaloalkyl)ketone is condensed with the appropriate aromatic reactant in the presence of the usual Friedel-Crafts catalysts, at moderate temperatures in the range of 50–150° C.; or the di(polyfluoroalkyl)ketone is reacted with an aryl-magnesium bromide in anhydrous ether, at temperatures which may be as low as −50° C. and generally need not exceed room temperature.

(6) The bis(ω-hydroperfluoroalkyl)carbinols, i.e., the compounds of Formula I where R and R' are ω-hydroperfluoroalkyl groups and A is hydrogen. These compounds can be prepared by the process described by C. D. VerNooy in U.S. Patent 3,022,356 which consists in (a) telomerizing tetrafluoroethylene and methanol as described in U.S. Patent 2,558,628; (b) esterifying the primary alcohols present in the reaction mixture with a carboxylic acid or anhydride; and (c) distilling the resulting reaction mixture to separate the bis(ω-hydroperfluoroalkyl)carbinols from the esters of the primary alcohols.

For illustrative purposes, a number of representative specific polyhaloalcohols suitable for use in the compositions of this invention are listed below by name and formula—

2H-hexafluoro-2-propanol:

$$CF_3-CHOH-CF_3$$

2H-decafluoro-2-pentanol:

$$CF_3-CHOH-(CF_2)_2CF_3$$

3H-dodecafluoro-3-hexanol:

$$CF_3CF_2-CHOH-(CF_2)_2CF_3$$

4H-tetradecafluoro-4-heptanol:

$$CF_3(CF_2)_2-CHOH-(CF_2)_2CF_3$$

3H-tetradecafluoro(2,4-dimethyl-3-pentanol):

2H-hexachloro-2-propanol:

$$Cl_3C-CHOH-CCl_3$$

1,3-dichloro-1,1,3,3-tetrafluoro-2-propanol:

$$ClF_2C-CHOH-CF_2Cl$$

1,1,3,3-tetrachloro-2-propanol:

$$HCl_2C-CHOH-CCl_2H$$

1H,3H,7H-dodecafluoro-3-heptanol:

$$H(CF_2)_2-CHOH-(CF_2)_4H$$

1H,5H,9H-hexadecafluoro-5-nonanol:

$$H(CF_2)_4-CHOH-(CF_2)_4H$$

Perfluoro(2,2-propanediol):

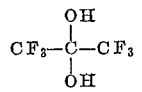

Perfluoro(8,8-pentadecanediol):

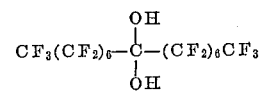

1,3,3-trichloro-1,1,3-trifluoro-2,2-propanediol:

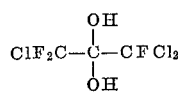

1,1,1-trichloro-3,3,3-trifluoro-2,2-propanediol:

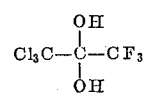

1,3-dichloro-1,1,3,3-tetrafluoro-2,2-propanediol:

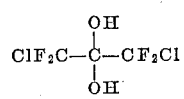

1H,5H-octafluoro-3,3-pentanediol:

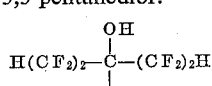

1H,25H-octatetracontafluoro-13,13-pentacosanediol:

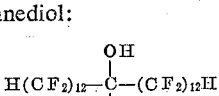

Perfluoro(1,1-cyclobutanediol):

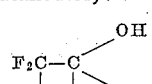

2,2-dichloro-3,3,4,4-tetra-
fluoro-1,1-cyclobutanediol:

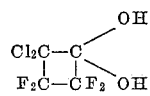

4-ethyltetradecafluoro-4-heptanol:

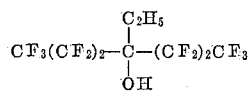

4-propyltetradecafluoro-4-
heptanol:

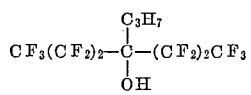

Perfluoro(2-methyl-2-propanol):

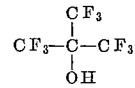

Perfluoro(4-methyl-4-heptanol):

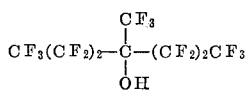

Perfluoro(4-propyl-4-heptanol):

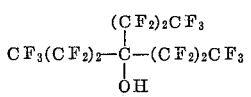

Perfluoro(7-hexyl-7-tridecanol):

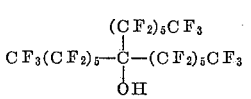

3H-dodecafluoro(2,3-dimethyl-2-
butanol):

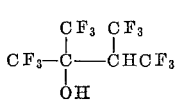

1H,13H-7-(6H-dodecafluorohexyl)-
tetracosafluoro-7-tridecanol:

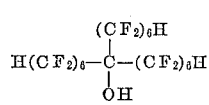

1,7-dichloro-4-(3-chlorohexafluoro-
propyl)dodecafluoro-4-heptanol:

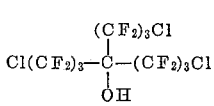

Perfluoro(cyclobutanol):

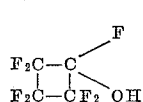

1-chlorohexafluorocyclobutanol:

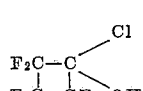

2,2-dichloropentafluorocyclo-
butanol:

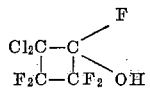

Perfluoro(4-heptanol):

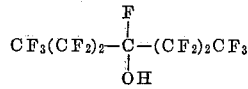

1,3-dichloropentafluoro-2-
propanol:

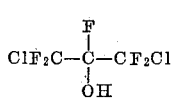

1,1,2,3,3-pentachloro-1,3-
difluoro-2-propanol:

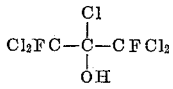

1H,7H-tridecafluoro-3-heptanol:

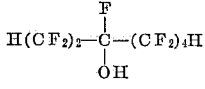

1H,9H-heptadecafluoro-5-nonanol:

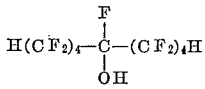

1-cyanohexafluorocyclobutanol:

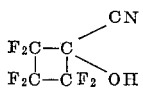

2-cyanohexafluoro-2-propanol:

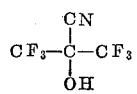

8-cyanotriacontafluoro-8-penta-
decanol:

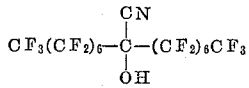

1,3-dichloro-2-cyanotetrafluoro-
2-propanol:

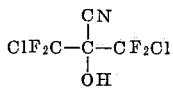

1H,7H-3-cyanododecafluoro-3-
heptanol:

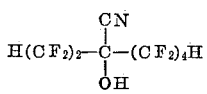

1-methoxyhexafluorocyclobutanol:

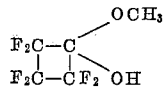

1-hexoxy-2,2-dichlorotetrafluoro-
cyclobutanol:

$$\begin{array}{c} \quad\quad OC_6H_{13} \\ Cl_2C\!-\!C \\ F_2C\!-\!CF_2\ \ OH \end{array}$$

4-propoxytetradecafluoro-4-heptanol:

$$\begin{array}{c} OC_3H_7 \\ CF_3(CF_2)_2\!-\!\underset{\underset{OH}{|}}{C}\!-\!(CF_2)_2CF_3 \end{array}$$

1H,17H-9-ethoxytriacontafluoro-9-
heptadecanol:

$$\begin{array}{c} OC_2H_5 \\ H(CF_2)_8\!-\!\underset{\underset{OH}{|}}{C}\!-\!(CF_2)_8H \end{array}$$

2-methoxy-1,3-dichloro-1,1,3,3-
tetrafluoro-2-propanol:

$$\begin{array}{c} OCH_3 \\ ClF_2C\!-\!\underset{\underset{OH}{|}}{C}\!-\!CF_2Cl \end{array}$$

1,3-dichloro-1,1,3,3-tetrafluoro-2-
phenyl-2-propanol:

$$\begin{array}{c} C_6H_5 \\ ClF_2C\!-\!\underset{\underset{OH}{|}}{C}\!-\!CF_2Cl \end{array}$$

2-phenylhexafluoro-2-propanol:

$$\begin{array}{c} C_6H_5 \\ CF_3\!-\!\underset{\underset{OH}{|}}{C}\!-\!CF_3 \end{array}$$

1H,7H-3-(p-hydroxyphenyl)dodecafluoro-
3-heptanol:

$$\begin{array}{c} C_6H_4OH \\ H(CF_2)_2\!-\!\underset{\underset{OH}{|}}{C}\!-\!(CF_2)_4H \end{array}$$

1H,7H-3-(p-tolyl)dodecafluoro-3-
heptanol:

$$\begin{array}{c} C_6H_4\!-\!CH_3 \\ H(CF_2)_2\!-\!\underset{\underset{OH}{|}}{C}\!-\!(CF_2)_4H \end{array}$$

1,3-dichloro-1,1,3,3-tetrafluoro-2-
(p-hydroxyphenyl)-2-propanol:

$$\begin{array}{c} C_6H_4OH \\ ClF_2C\!-\!\underset{\underset{OH}{|}}{C}\!-\!CF_2Cl \end{array}$$

1,1,3-trichloro-1,3,3-trifluoro-2-
(p-hydroxyphenyl-2-propanol:

$$\begin{array}{c} C_6H_4OH \\ Cl_2FC\!-\!\underset{\underset{OH}{|}}{C}\!-\!CF_2Cl \end{array}$$

1-chloro-1,1,3,3,4,4-hexafluoro-
2,2-butanediol:

$$\begin{array}{c} OH \\ ClF_2C\!-\!\underset{\underset{OH}{|}}{C}\!-\!CF_2CF_2H \end{array}$$

1,1,1-trichloro-3,3,4,4-tetra-
fluoro-2,2-butanediol:

$$\begin{array}{c} OH \\ Cl_3C\!-\!\underset{\underset{OH}{|}}{C}\!-\!CF_2CF_2H \end{array}$$

m-Bis(2-hydroxyhexafluoro-
isopropyl)benzene:

$$(CF_3)_2\underset{\underset{OH}{|}}{C}\!-\!C_6H_4\!-\!\underset{\underset{OH}{|}}{C}(CF_3)_2$$

1,1,4,4-tetrakis(chlorodifluoro-
methyl)-2-butyn-1,4-diol:

$$\begin{array}{c} ClF_2C \diagdown\quad\quad\quad\quad\quad\quad\diagup CF_2Cl \\ C\!-\!C\!\equiv\!C\!-\!C \\ ClF_2C \diagup\ \ OH\quad\quad OH\ \ \diagdown CF_2Cl \end{array}$$

1,3-dichloro-1,1,3,3-tetrafluoro-
2-(3-ethyl-4-hydroxyphenyl)-
2-propanol:

$$\begin{array}{c} \quad\quad\quad C_2H_5 \\ \quad C_6H_3 \\ \quad\quad\quad \diagdown OH \\ ClF_2C\!-\!\underset{\underset{OH}{|}}{C}\!-\!CF_2Cl \end{array}$$

1-phenylhexafluorocyclobutanol:

$$\begin{array}{c} \quad\quad\quad C_6H_5 \\ F_2C\!-\!C \\ F_2C\!-\!CF_2\ \ OH \end{array}$$

1-(p-tolyl)hexafluorocyclobutanol:

$$\begin{array}{c} \quad\quad\quad C_6H_4\!-\!CH_3 \\ F_2C\!-\!C \\ F_2C\!-\!CF_2\ \ OH \end{array}$$

1-[α-(β-hydroxynaphthyl]-2-
chloropentafluorocyclobutanol:

$$\begin{array}{c} \quad\quad\quad C_{10}H_6OH \\ ClFC\!-\!C \\ F_2C\!-\!CF_2\ \ OH \end{array}$$

The remarkable solvent power of the polyhaloalcohols defined by formula I is attributed to the fact that they possess very strong hydrogen bonding properties, and thus can form hydrogen bonds with polymers containing electron donors such as oxygen and nitrogen atoms. Hydrogen bonding strength can be recognized by comparing the infrared absorption spectra of the alcohol being tested when determined (1) in a typical non-complexing medium such as carbon tetrachloride, and (2) in a typical complexing, or bonding, medium such as tetrahydrofuran. With alcohols having hydrogen bonding properties, a displacement of the hydroxyl group absorption band is observed in the spectrum obtained in (2) relative to the spectrum obtained in (1). The magnitude of this displacement, or shift, is a measure of the hydrogen bonding power. With the polyhaloalcohols defined by Formula I, the wavelength of the infrared absorption band of the hydroxyl group when determined in tetrahydrofuran is displaced by a positive interval of at least 0.34 micron from its value when determined in carbon tetrachloride.

The following table indicates the magnitude of this wavelength displacement for a number of the polyhaloalcohols suitable for use in the compositions of this invention. The second column shows the stretching mode wavelength in microns ($\lambda_s$, $\mu$) for the hydroxyl group when the alcohol is dissolved in carbon tetrachloride at 0.05 M concentration, a concentration as low as possible being desired to prevent or minimize interaction between the hydroxyl groups of the alcohol molecules. The third column shows the stretching mode wavelength in tetrahydrofuran (THF) at 1.0 M concentration, the concentration in this case being immaterial but preferably high enough to permit accurate determination of the absorption band. The fourth column shows the increase in absorption band wavelength ($\Delta\lambda_s$) produced by the formation of hydrogen bonds in the bonding solvent, tetrahydrofuran.

TABLE I

| Polyhaloalcohol | $\lambda_s, \mu$ (unbonded) 0.05M in CCl$^4$ | $\lambda_s, \mu$ (bonded) 0.1M in THF | $\Delta\lambda_s, \mu$ |
|---|---|---|---|
| (CF$_3$)$_2$C(OH)CH(CF$_3$)$_2$ | 2.77 | 3.22+ | 0.45+ |
| H(CF$_2$)$_2$C(OH)$_2$(CF$_2$)$_4$H | 2.78 | 3.20 | 0.42 |
| CF$_2$ClC(OH)$_2$CFCl$_2$ | 2.79 | 3.20 | 0.41 |
| CFCl$_2$C(OH)$_2$CFCl$_2$ | 2.80 | 3.21 | 0.41 |
| (CF$_3$)$_2$CFCHOHCF(CF$_3$)$_2$ | 2.76 | 3.17 | 0.41 |
| (CF$_2$Cl)$_2$C(OH)C$_6$H$_5$ | 2.78 | 3.16 | 0.38 |
| (CF$_3$)$_2$C(OH)C$_6$H$_5$ | 2.79 | 3.17 | 0.38 |
| CF$_3$CHOHCF$_3$ | 2.77 | 3.12 | 0.35 |
| CFCl$_2$CHOHCF$_2$Cl | 2.77 | 3.14 | 0.37 |
| CF$_2$ClCHOHCF$_2$Cl | 2.77 | 3.11 | 0.34 |
| H(CF$_2$)$_2$CHOH(CF$_2$)$_4$H | 2.78 | 3.14 | 0.36 |
| Cl$_3$CCHOHCCl$_3$ | 2.77 | 3.14 | 0.37 |
| CF$_2$ClC(OH)$_2$CF$_2$Cl | 2.80 | 3.15 | 0.35 |
| 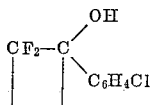 | 2.78 | 3.15 | 0.37 |

In contrast, polyhaloalcohols of closely related structure but not corresponding to Formula I, e.g., primary polyhaloalcohols and alcohols containing only one polyhaloalkyl group, show an appreciably smaller wavelength displacement of the hydroxyl absorption bands under identical test conditions, as shown by the following table. Polyhaloalcohols of this type are much less effective solvents for high molecular weight polyamides and polyesters.

TABLE II

| Alcohol | $\lambda_s, \mu$ (unbonded) 0.05M in CCl$_4$ | $\lambda, \mu$ (bonded) 1.0M in THF | $\Delta\lambda_s, \mu$ |
|---|---|---|---|
| CF$_3$CH$_2$OH | 2.76 | 2.98 | 0.22 |
| (C$_6$H$_5$)$_2$C(OH)CF$_3$ | 2.78 | 3.05 | 0.27 |
| H(CF$_2$)$_8$CH$_2$OH | 2.75 | 2.98 | 0.23 |
| CF$_3$CF$_2$CH$_2$OH | 2.75 | 2.98 | 0.23 |
| H(CF$_2$)$_2$CH$_2$OH | 2.75 | 2.96 | 0.21 |
| CF$_3$(CF$_2$)$_2$CH(OH)$_2$ | 2.78 | 3.07 | 0.29 |
| CF$_3$CH(OH)$_2$ | 2.79 | 3.05 | 0.26 |
| ClCH$_2$CH$_2$OH | 2.77 | 2.91 | 0.14 |

Most of the polyhaloalcohols defined by Formula I are liquids at ordinary temperature. Others are solids with generally low or moderately high melting points. Such solids, however, are entirely suitable for use in compositions of this invention since, at or slightly above their melting point, they readily dissolve polymers of the type defined above. In some cases, the solutions remain liquid at room temperature owing to the melting point-depressing effect of the solute. In other cases, they solidify to solid solutions, which can be reliquefied readily on warming when a fluid solution is needed. Furthermore, the normally solid polyhaloalcohols are very suitable for the preparation of solid, homogeneous blends with the polymer, to which they impart plasticizing or softening effects.

The polymers with which this invention is concerned are the synthetic, linear, condensation-type polymers whose repeating units contain amido (carbonylamino) or ester (carbonyloxy) groups, these groups being intralinear, that is, integral members of the linear polymeric chain or "backbone," and thus not present as pendant or extralinear groups. Polymers of these types, which are well-known in the art and require no elaborate description, are characterized by the presence of repeating units containing the intralinear linkage or functional group

where X is oxygen or nitrogen. When X is nitrogen, the polymer is a polyamide having the characteristic carbonylamino functional group

In more specific types of polyamides, this group can be present in various combinations, for example as

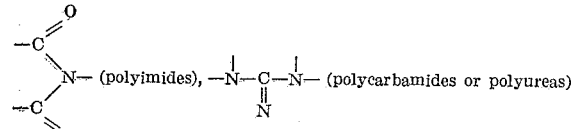 (polyimides), —N—C—N— (polycarbamides or polyureas)

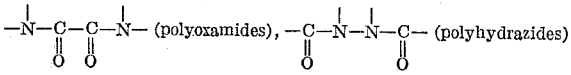

—N—C—C—N— (polyoxamides), —C—N—N—C— (polyhydrazides)

and

—N—C—N—N—C—N— (polybis-ureylenes)

When X is oxygen the polymer is a polyester having the characteristic carbonyloxy functional group

—C—O—
  ‖
  O which, in more specific types of polyesters, is present, for example, as —O—C—O— (polycarbonates), —O—C—C—O— (polyoxalates)

and

—N—C—O— (polycarbamates or polyurethanes)

In these functional groups, the free valences are attached to carbon atoms of the linear polymeric chain, themselves attached only to carbon and/or hydrogen, and any nitrogen valence not attached to a carbon atom of the linear polymeric chain is satisfied by hydrogen or a monovalent organic radical, usually hydrocarbon.

The term "polymers" as used herein includes copolymers containing repeating units of two or more different kinds, for example copolyesters or copolyamides, polyesteramides or polyamide-polyurethanes, and copolymers containing units other than ester or amide units, with the proviso, however, that in such copolymers at least two-thirds of the repeating units present contain the already defined linkage

in order that the copolymer possess the requisite characteristics of solubility in, and compatibility with, the polyhaloalcohols which constitute the other essential ingredients in the compositions of this invention. Otherwise expressed, the copolymer should contain at least two-thirds, on a molar basis, of the ester- or amide-containing repeating unit or "mer."

The condensation type polymers with which this invention is concerned have been extensively described in the patent or journal literature. It will suffice to mention by way of examples some of the technically more important classes of these polymers.

Among the polyamides may be mentioned those described in U.S. Patents 2,071,250; 2,071,251; 2,130,948 and 2,130,523, which are derived from dibasic acids such as carbonic, oxalic, succinic, adipic, suberic and sebacic acids, and diamines such as hydrazine, ethylenediamine, pentamethylenediamine, hexamethylenediamine, decamethylenediamine or tetradecamethylenediamine, including those polyamides derived from cyclic reactants such as the polyamides from di(p-aminocyclohexyl)methane (U.S. Patent 2,512,606), or poly(p-phenylene terephthalamide) or poly(m-phenylene isophthalamide/terephthalamide); the polyamides derived from monoamino-monocarboxylic acids or from their cyclic lactams (U.S. Patents 2,071,250; 2,071,253; 2,241,322), e.g., the polyamides of 6-aminocaproic acid, 11-aminoundecanoic acid or 12-aminostearic acid, including the polyamides of $\alpha$-aminoacids such as leucine, $\beta$-phenylalanine or 1-aminocyclohexanecarboxylic acid; the copolyamides from diamines, dicarboxylic acids and aminoacids, e.g., those of U.S. Patent 2,312,966; the polycarbamides made from diurethanes and diamines (U.S. Patent 2,181,663), e.g., the decamethylenehexamethylene carbamide polymer or the N,N′ - dimethylhexamethylene - hexamethylene carbamide polymer, or from diisocyanates and diamines (U.S. Patent 2,292,443), e.g., the polyamides from hexamethylenediisocyanate and p-xylylenediamine or from m-phenylenediisocyanate and m-phenylenediamine; the polyesteramides made from diamines, glycols and dicarboxylic acids (U.S. Patent 2,224,037) or from monoaminomonohydric alcohols and dicarboxylic acids with or without glycols, diamines or aminoacids (U.S. Patents 2,312,879 and 2,936,248); the polymers containing both amido and urethane (carbamate) linkages such as those of U.S. Patent 2,970,987; the polymers containing bis-ureylene linkages and ester, amido or urethane linkages such as those of U.S. Patent 2,957,852; the polyamides made from diprimary diamines and tri- or tetracarboxylic acids having two carboxyl groups attached to adjacent carbon atoms (British Patent 570,858; U.S. Patent 2,710,853), e.g., those derived from pyromellitic acid and nonamethylenediamine.

Among the polyesters may be mentioned those described in U.S. Patents 2,012,267; 2,071,250; 2,071,251 and 2,210,817, which are derived from dibasic acids such as carbonic, oxalic, succinic, glutaric, adipic or sebacic acids and glycols such as ethylene glycol, propylene glycol, trimethylene glycol, hexamethylene glycol or decamethylene glycol, and particularly from aromatic dicarboxylic acids such as terephthalic and isophthalic acid and ethylene glycol; or from hydroxyacids such as hydroxypivalic acid, $\alpha$-hydroxyisobutyric acid, $\omega$-hydroxycaproic acid or $\omega$-hydroxydecanoic acid, or from mixtures of such reactants; the polyesters containing minor amounts of metal arylsulfonate groups, such as are described in British Patent 826,248; the already mentioned polyesteramides; the polycarbamates (polyurethanes) such as those of U.S. Patents 2,284,637 or 2,284,896, which are derived from diisocyanates such as hexamethylene, decamethylene, m-phenylene or p-phenylene diisocyanate and glycols or phenols such as hexamethylene glycol, decamethylene glycol, di($\beta$-hydroxyethyl)ether, cyclohexanediol-1,4, 2,2-di(4-hydroxyphenyl)propane or resorcinol, or from diisocyanates and low molecular weight polyesters or polyesteramides, as described in U.S. Patent 2,333,639; the already mentioned poly(amide-carbamates); etc.

The solubility problem is particularly acute with homopolyamides and homopolyesters, by which is meant, of course, polymers in which all repeating units are the same, and especially when such homopolymers contain no lateral substituents attached to the linear polymer chain, that is, are prepared from straight chain (unbranched) reactants. Thus, it is with respect to such polymers that the invention has its greatest usefulness.

The polymer-solvent mixtures of this invention are homogeneous, single-phase compositions. From the standpoint of physical characteristics, they comprise solid compositions in which the polymer is plasticized or otherwise modified with minor amounts of the polyhaloalcohol, which may be as low as 0.5% by weight of the polymer, i.e., a weight ratio of 0.005:1; semisolid compositions, in which the polymer has incorporated therein sufficient amounts of the polyhaloalcohol to make it readily deformable; highly viscous solutions; and fluid solutions, which can contain as much as 10,000% of the polyhaloalcohol by weight of the polymer, i.e., a weight ratio of 100:1. In general, the most useful compositions, which may be fluid or solid at room temperature, are those containing the polyhaloalcohol and the polymer in weight ratios between 0.01:1 and 50:1.

The compositions can contain more than one polyhaloalcohol solvent. For example, it is sometimes advantageous to prepare a solution of polymer in a mixture of two or more polyhaloalcohols, one of which is readily volatile while the other or others have low volatility and are retained, at least in part, within the polymer upon evaporation of the volatile solvent. Similarly, the polyhaloalcohol can be used in admixture with other materials having some degree of solvent action on the polymer, e.g., phenols in the case of polyamides and ketones or esters in the case of polyesters.

Compositions, and especially fluid solutions, which comprise, in addition to the polyhaloalcohol solvent, an organic liquid miscible therewith but which is a non-solvent for the polymer, are also within the scope of this invention. Such compositions sometimes offer technical advantages, e.g., they may lend themselves better to the formation of shaped objects by extrusion or casting. Water may also be present in amounts such that the polymer composition remains homogeneous. Thus, some polyhaloketone hydrates can form more or less well defined higher hydrates containing from about 0.5 to about 1.5 moles of additional water. Such higher hydrates, which are liquid at room temperature, are very suitable for the purposes of this invention. Higher amounts of water can be tolerated in some cases.

The compositions can, of course, contain various nonessential ingredients such as resins, waxes, anti-oxidants, corrosion inhibitors, ultraviolet light absorbers, acid acceptors, fillers, and other additives.

The polymer-solvent compositions are prepared by the usual methods of blending, mixing, dissolving, etc. which are conventional in the polymer art. As already noted, the polyhaloalcohol solvents defined above have the great advantage that, in most cases, they can be compounded with the polymer to form homogeneous blends or fluid solutions at low or moderate temperatures.

The following examples illustrate specific embodiments of the invention.

*Example I*

A mixture, in the weight ratio of about 1:10, of a commercial sample of polyhexamethyleneadipamide in the form of a fabric and 3H-dodecafluoro(2,3-dimethyl-2-butanol), $(CF_3)_2C(OH)CH(CF_3)_2$, was stirred at 25° C. The polymer dissolved readily to give a clear solution. The solution was cast on a glass plate and the solvent was allowed to evaporate, leaving a coherent film of the polyamide.

The polyfluoroalcohol used in this example was prepared by stirring at room temperature a mixture of 30 g. (0.1 mole) of tetrakis(trifluoromethyl)ethylene, 10 ml. of water, 3 ml. of triethylamine and 50 ml. of acetonitrile. After two days, the mixture became homogeneous. Water (100 ml.) was added and the organic layer was separated, washed with 10% hydrochloric acid and water again, dried over silica gel and distilled to give 20.6 g. of the adduct of the alcohol and acetonitrile as a colorless liquid, B.P. 107° C. The acetonitrile was removed from this material by washing it with 20% oleum. The pure alcohol was obtained on redistillation as a colorless liquid, B.P. 95–96° C. *Analysis.*—Calcd. for $C_6H_2F_{12}O$: C, 22.65; H, 0.64; F, 71.68. Found: C, 23.22; H, 0.87; F, 72.17.

*Example II*

A solution was prepared as in Example I of 12 g. of polyhexamethyleneadipamide in 100 ml. of 1,3-dichloro-1,1,3,3-tetrafluoro-2,2-propanediol,

at 25° C., and a coherent film of the polyamide was made by casting this solution on a glass plate and allowing the solvent to evaporate.

The 1,3-dichloro-1,1,3,3-tetrafluoro-2,2-propanediol used in this and other examples, which may also be called s-dichlorotetrafluoroacetone hydrate, was prepared by dropwise addition of 55 g. (3.04 moles) of water of 607 g. (3.04 moles) of s-dichlorotetrafluoroacetone. It boils at 106° C. with decomposition.

*Example III*

Strips of commercial polyethylene terephthalate film, 1½" wide and 4 mils thick, were spliced together by overlapping the ends about ¼" and moistening the overlapping surfaces with one of the following polyhaloalcohols:

(A) 1,3-dichloro-1,1,3,3-tetrafluoro-2,2-propanediol,
(B) 1,3-dichloro-1,1,3,3-tetrafluoro-2-propanol, $$ClF_2-C-CHOH-CF_2Cl$$

(C) 3H-tetradecafluoro(2,4-dimethyl-3-pentanol), $$(CF_3)_2CF-CHOH-CF(CF_3)_2$$

After evaporation of the solvent, the spliced films were homogeneous in appearance and their strength (load bearing capacity) was substantially the same as that of the initial film.

Solvent (C) used in this example, which may also be called bis(perfluoroisopropyl)carbinol, was prepared by reduction of bis(perfluoroisopropyl)ketone with lithium aluminum hydride in tetrahydrofuran at 40–50° C. The resulting bis(perfluoroisopropyl)carbinol/tetrahydrofuran 1:1 complex was distilled (B.P., 133° C.) and decomposed with 20% oleum to give bis(perfluoroisopropyl)carbinol, B.P. 113–114° C. *Analysis.*—Calcd. for $C_7H_2F_{14}O$: C, 22.84; H, 0.55; F, 72.26. Found: C, 23.06; H, 0.81; F, 73.58.

Solvent (B) was prepared in a similar manner by reduction of dichlorotetrafluoroacetone. It boils at 107° C.

*Example IV*

Solutions of polyhexamethyleneadipamide molding resin in 1,3-dichloro-1,1,3,3-tetrafluoro-2,2-propanediol were prepared. These solutions used as described below to impregnate various porous materials.

(a) Filter paper was dipped in a solution of 0.5% concentration and the solvent was removed by evaporation at 25° C. The paper showed a weight gain of 4%. Its wet strength was substantially improved but it was in other respects similar to the untreated paper. At a higher weight gain of the order of 7.5%, obtained by using a more concentrated solution (1.0% of polyamide by weight) the paper was stiffened and showed water-repellent properties.

(b) Cotton fabrics were impregnated by application of a 0.5% solution with a doctor knife followed by evaporation of the solvent at 70° C. At weight gains of 5.5 and 8.2%, the fabrics showed improved dimensional stability on washing, yet accepted dyes readily.

*Example V*

The solutions of Example IV were used for coating wood and metal as follows:

(a) A solution containing 10% by weight of the polyamide was applied on a wood panel by dipping the panel into the solution and evaporating the solvent at 25° C. There was obtained a coherent, abrasion-resistant coating which was water- and oil-repellent.

(b) A steel panel was coated by dipping into 10% solution of the polyamide. After removal of the solvent at 25° C., a tough, abrasion-resistant coating was produced that decreased rust formation on the metal.

*Example VI*

A solution containing 10% by weight of polyhexamethyleneadipamide in 1,3-dichloro-1,1,3,3-tetrafluoro-2,2-propanediol was cast on a polished metal plate that had been preheated to 60° C. After casting, the plate temperature was increased to about 80° C. and held at that point for about 20 minutes to complete the removal of the solvent. The polyamide film was readily detachable from the support. It was a smooth, strong film approximately 2 mils thick.

This procedure was repeated with similar results with a 10% polyhexamethyleneadipamide solution in which the solvent was a 60/40 mixture by volume of the same polyhaloalcohol and benzene.

*Example VII*

A solution containing 10% by weight of polyhexamethyleneadipamide in 1,3-dichloro-1,1,3,3-tetrafluoro-2,2-propanediol was used as an adhesive to joint together two pieces of fabric made of polyhexamethyleneadipamide. After evaporation of the solvent, a very strong and smooth bond was formed the pieces.

*Example VIII*

A mixture of 18 g. of 1,3-dichloro-1,1,3,3-tetrafluoro-2,2-propanediol and 2 g. of a high melting polyamide obtained by the condensation of di(p-aminocyclohexyl)methane and adipic acid was stirred for several hours at 20–25° C. The resulting smooth, viscous solution was cast onto a polished metal plate and the solvent was allowed to evaporate at room temperature. A coherent, uniform, self-supporting film of the polyamide was detached from the plate by immersing it in water.

*Example IX*

A mixture of 2.0 g. of 1,3-dichloro-1,1,3,3-tetrafluoro-2,2-propanediol and 0.1 g. of a polyurethane composed of the repeating unit $$\left[ \begin{array}{c} C_6H_5 \\ | \\ -N-C \\ \phantom{-N-}\diagdown \\ \phantom{-N-C}CH=CH \end{array} \begin{array}{c} CH-CH \\ \diagup \phantom{CH} \diagdown \\ \phantom{CH-} C-N-C-O-C \\ \phantom{CH-CH} \end{array} \begin{array}{c} C_6H_5 \; O \\ | \phantom{CC} \| \\ \end{array} \begin{array}{c} CH-CH \\ \diagup \phantom{CH} \diagdown \\ \phantom{CH-}C-O-C \\ \phantom{CH-CH} \diagdown \phantom{CH}\diagup \\ \phantom{CH-}CH=CH \end{array} \begin{array}{c} O \\ \| \\ \\ \end{array} \right]$$

was warmed to about 100° C. The resulting solution was cast while warm on a glass plate and the solvent was evaporated at 25° C. A coherent, self-supporting film of the polyurethane was obtained.

A similar solution and film were prepared from 0.1 g. of the same polyurethane and 2.0 g. of perfluoro-2,2-propanediol one-half hydrate, $(CF_3)_2C(OH)_2 \cdot \tfrac{1}{2}H_2O$. The solution was preparaed by warming the mixture to 95° C.

*Example X*

Solutions of approximately 5% concentration were prepared by dissolving at 25° C. in 1,3-dichloro-1,1,3,3-tetrafluoro-2,2-propanediol and in perfluoro-2,2-propanediol one-half hydrate a polymer containing both bisureylene and carbamate groups. This polymer was prepared, essentially as described in Example V of U.S. Patent 2,957,852, by reacting low molecular weight poly(tetramethylene oxide) glycol with methylene bis(4-phenylisocyanate), then treating the polyether diurethane having isocyanate end groups with hydrazine hydrate, and finally "end-capping" the resulting polymer with diethylamine. The solutions were made by stirring the ingredients at 95° C. Flexible films having rubber-like properties were obtained by casting these solutions on glass plates and allowing the solvent to evaporate at room temperature.

*Example XI*

Solutions of approximately 5% concentration were made by dissolving polyhexamethylene terephthalamide in the following polyhaloalcohols: 1,3-dichloro-1,1,3,3-tetrafluoro-2,2-propanediol; perfluoro-2,2-propanediol one-half hydrate; and 2H-hexafluoro-2-propanol, $$CF_3-CHOH-CF_3$$

The solutions were prepared at 25° C. Coherent, uniform films of the polyamide were obtained by casting these solutions onto glass plates and allowing the solvent to evaporate at 25° C.

*Examples XII–XXII*

Mixtures were prepared comprising, in approximately 95:5 weight ratio, the polyhaloalcohols listed below and one of the following polymers: (A) polyhexamethyleneadipamide; (B) the polyamide from 6-aminocaproic acid; (C) polyethylene terephthalate. The polymers dissolved at room temperature or at the melting point of the solvents to give clear, homogeneous solutions from which polymer films were obtained readily by casting on a support and evaporating the solvent.

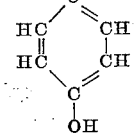

The compositions of this invention have many and varied technical applications. The foregoing examples have illustrated some of their uses, including the preparation of self-supporting films and of protective coatings on various surfaces, the impregnation of porous materials such as paper and textile fabrics, and the bonding together of articles made of the polymeric ingredient. Fluid polymer solutions are further eminently suitable for many other uses, such as solution spinning of filaments, rods or tubes, wire coating, etc. Solutions of suitable viscosity are useful as adhesives to join together surfaces such as wood, metals, ceramics, plastics, etc. Solid plasticized compositions containing minor amounts of polyhaloalcohol solvents are suitable as molding powders for use in the fabrication of shaped objects, for example by injection molding or compression molding, or by melt extrusion into films, rods, tubes and other shapes.

Since obvious modifications and equivalents in the invention will be evident to those skilled in the chemical arts, I propose to be bound solely by the appended claims.

The embodiment of the invention in which an exclusive property or privilege is claimed are defined as follows:

1. A composition of matter comprising, in intimate homogeneous single-phase admixture,
   (I) a normally solid, synthetic, essentially linear condensation polymer of a molecular weight of at least 3,000, said polymer having repeating interlinear units at least two-thirds of which are selected from the group consisting of amido and ester, and
   (II) at least one polyhaloalcohol, in which all halogen is of atomic number 9–17, of the group consisting of

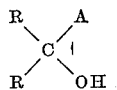

and

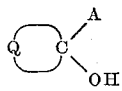

wherein:
   A is selected from the group consisting of hydrogen, hydroxyl, halogen, cyano, alkoxy of 1–6 carbons, and hydrocarbon, hydroxyhydrocarbon, and halohydroxyhydrocarbon of 1–10 carbons;
   R and R' are selected from the group consisting of monovalent fluoroperhalomethyl and perfluoroalkyl, ω-hydroperfluoroalkyl and ω-chloroperfluoroalkyl of 2–12 carbons; and
   Q is divalent perhalotrimethylene wherein 0–2 halogens are chlorine, all others being fluorine, the polymer:polyhaloalcohol weight ratio in said composition of matter being between 1:0.005 and 1:100.

2. The composition of matter of claim 1 in the form of a solution.

3. The composition of matter of claim 1 in the form of a plasticized polymer.

4. The composition of matter of claim 1 wherein R and R' are fluoroperhalomethyl and A is hydrogen.

5. The composition of matter of claim 1 wherein R and R' are fluoroperhalomethyl and A is hydroxyl.

6. A composition of matter comprising, in intimate homogeneous single-phase admixture,
   (I) a normally solid, synthetic, essentially linear polyamide of a molecular weight of at least 3,000, in which at least two-thirds of the repeating interlinear units contain an amido group, and
   (II) at least one polyhaloalcohol, in which all halogen is of atomic number 9–17, of the group consisting of

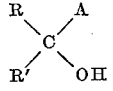

and

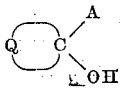

wherein:
A is selected from the group consisting of hydrogen, hydroxyl, halogen, cyano, alkoxy of 1–6 carbons, and hydrocarbon, hydroxyhydrocarbon, and halohydroxyhydrocarbon of 1–10 carbons;
R and R' are selected from the group consisting of monovalent fluoroperhalomethyl and perfluoroalkyl, ω-hydroperfluoroalkyl and ω-chloroperfluoroalkyl of 2–12 carbons; and
Q is divalent perhalotrimethylene wherein 0–2 halogens are chlorine, all others being fluorine, the polyamide:polyhaloalcohol weight ratio in said composition of matter being between 1:0.005 and 1:100.

7. A composition of matter comprising, in intimate homogeneous single-phase admixture,
(I) a normally solid, synthetic, essentially linear polyester of a molecular weight of at least 3,000, in which at least two-thirds of the repeating interlinear units contain an ester group, and
(II) at least one polyhaloalcohol, in which all halogen is of atomic number 9–17, of the group consisting of

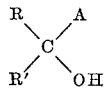

and

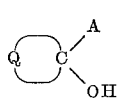

wherein:
A is selected from the group consisting of hydrogen, hydroxyl, halogen, cyano, alkoxy of 1–6 carbons, and hydrocarbon, hydroxyhydrocarbon, and halohydroxyhydrocarbon of 1–10 carbons;
R and R' are selected from the group consisting of monovalent fluoroperhalomethyl and perfluoroalkyl, ω-hydroperfluoroalkyl and ω-chloroperfluoroalkyl of 2–12 carbons; and
Q is divalent perhalotrimethylene wherein 0–2 halogens are chlorine, all others being fluorine, the polyester:polyhaloalcohol weight ratio in said composition of matter being between 1:0.005 and 1:100.

8. A solution of a normally solid polyhexamethyleneadipamide of a molecular weight of at least 3000 in 3H-dodecafluoro(2,3-dimethyl-2-butanol), the adipamide:butanol weight ratio in said solution being between 1:0.005 and 1:100.

9. A solution of a normally solid polyhexamethyleneadipamide of a molecular weight of at least 3000 in 1,3-dichloro-1,1,3,3-tetrafluoro-2,2-propanediol, the adipamide:propanediol weight ratio in said solution being between 1:0.005 and 1:100.

10. A solution of a normally solid polyethylene terephthalate of a molecular weight of at least 3000 in 1,3-dichloro-1,1,3,3-tetrafluoro-2,2-propanediol, the terephthalate:propanediol weight ratio in said solution being between 1:0.005 and 1:100.

11. A solution of a normally solid polyethylene terephthalate of a molecular weight of at least 3000 in 1,3-dichloro-1,1,3,3-tetrafluoro-2-propanol, the terephthalate propanol weight ratio in said solution being between 1:0.005 and 1:100.

12. A solution of a normally solid polyethylene terephthalate of a molecular weight of at least 3000 in 3H-tetrafluoro(2,4-dimethyl-3-pentanol), the terephthalate:pentanol weight ratio in said solution being between 1:0.005 and 1:100.

13. A normally solid, synthetic, essentially linear condensation polymer of a molecular weight of at least 3000, said polymer having repeating interlinear units at least two-thirds of which are selected from the group consisting of amido and ester,
plasticized by means of at least one polyhaloalcohol, in which all halogen is of atomic number 9–17, of the group consisting of

and

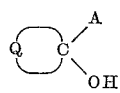

wherein:
A is selected from the group consisting of hydrogen, hydroxyl, halogen, cyano, alkoxy of 1–6 carbons, and hydrocarbon, hydroxyhydrocarbon, and halohydroxyhydrocarbon of 1–10 carbons;
R and R' are selected from the group consisting of monovalent fluoroperhalomethyl and perfluoroalkyl, ω-hydroperfluoroalkyl and ω-chloroperfluoroalkyl of 2–12 carbons; and
Q is divalent perhalotrimethylene wherein 0–2 halogens are chlorine, all others being fluorine.

14. Normally solid polyethylene terephthalate of a molecular weight of at least 3000 plasticized by means of 1,3-dichloro-1,1,3,3-tetrafluoro-2,2-propanediol.

15. Normally solid polyethylene terephthalate of a molecular weight of at least 3000 plasticized by means of 1,3-dichloro-1,1,3,3-tetrafluoro-2-propanol.

16. Normally solid polyethylene terephthalate of a molecular weight of at least 3000 plasticized by means of 3H-tetradecafluoro(2,4-dimethyl-3-pentanol).

References Cited by the Examiner
UNITED STATES PATENTS

| | | | |
|---|---|---|---|
| 2,882,186 | 4/1959 | Schonberg et al. | 260—33.4 |
| 2,905,657 | 9/1959 | Huffman | 260—33.4 |
| 2,927,906 | 3/1960 | Schlack | 260—33.4 |
| 3,030,409 | 4/1962 | Andreas et al. | 260—488 |
| 3,148,220 | 9/1964 | England | 260—33.4 |

OTHER REFERENCES

F. W. Billmeyer: "Textbook of Polymer Chemistry," Interscience Publishers Inc., New York (1957), pages 20, 29, 317–18 and 343–49 relied upon.

MORRIS LIEBMAN, *Primary Examiner.*
WILLIAM H. SHORT, *Examiner.*